US007452594B2

(12) United States Patent
Pickering

(10) Patent No.: US 7,452,594 B2

(45) Date of Patent: Nov. 18, 2008

(54) FUSER MEMBER SYSTEM AND PROCESS

(75) Inventor: Jerry A. Pickering, Hilton, NY (US)

(73) Assignee: Eastman Kodak Company, Rochester, NY (US)

( * ) Notice: Subject to any disclaimer, the term of this patent is extended or adjusted under 35 U.S.C. 154(b) by 392 days.

(21) Appl. No.: 11/281,856

(22) Filed: Nov. 17, 2005

(65) Prior Publication Data

US 2007/0110993 A1 May 17, 2007

(51) Int. Cl.

| | |
|---|---|
| ***B32B 25/02*** | (2006.01) |
| ***B32B 25/14*** | (2006.01) |
| ***B32B 25/20*** | (2006.01) |
| ***G03G 15/20*** | (2006.01) |

(52) U.S. Cl. ...................... 428/323; 428/339; 428/421; 428/447; 428/448; 399/333

(58) Field of Classification Search ...................... None
See application file for complete search history.

(56) References Cited

U.S. PATENT DOCUMENTS

| | | | | |
|---|---|---|---|---|
| 4,011,362 | A | | 3/1977 | Stewart |
| 4,029,827 | A | | 6/1977 | Imperial et al. |
| 4,046,795 | A | | 9/1977 | Martin |
| 4,101,686 | A | | 7/1978 | Strella et al. |
| 4,185,140 | A | | 1/1980 | Strella et al. |
| 4,257,699 | A | | 3/1981 | Lentz |
| 4,515,884 | A | | 5/1985 | Field et al. |
| 5,017,432 | A | | 5/1991 | Eddy et al. |
| 5,177,552 | A | | 1/1993 | Isogai et al. |
| 5,269,740 | A | * | 12/1993 | Fitzgerald et al. ............. 492/56 |
| 5,455,313 | A | | 10/1995 | Kurusu et al. |
| 5,480,930 | A | | 1/1996 | Gentle et al. |
| 5,530,536 | A | | 6/1996 | Henry et al. |
| 5,531,813 | A | | 7/1996 | Henry et al. |
| 5,582,917 | A | | 12/1996 | Chen et al. |
| 5,608,508 | A | | 3/1997 | Kumagai et al. |
| 5,780,545 | A | | 7/1998 | Chen et al. |
| 5,781,840 | A | | 7/1998 | Chen et al. |
| 5,803,887 | A | * | 9/1998 | Fukunaga .................... 492/59 |
| 5,824,416 | A | | 10/1998 | Chen et al. |
| 6,011,946 | A | | 1/2000 | Eddy et al. |
| 6,117,508 | A | | 9/2000 | Parsonage et al. |
| 6,127,041 | A | | 10/2000 | Szostek et al. |
| 6,281,279 | B1 | | 8/2001 | Davis et al. |

OTHER PUBLICATIONS

Nielsen, "The Thermal and Electrical Conductivity of Two-Phase Systems," Ind. Eng. Chem. Fundam., 1974, vol. 13, No. 1, pp. 17-20.

* cited by examiner

*Primary Examiner*—Ramsey Zacharia
(74) *Attorney, Agent, or Firm*—Carl F. Ruoff

(57) ABSTRACT

A fuser roller for toner fusing systems and processes, and including a base and a fusing surface layer. The fusing surface layer includes a first elastomer continuous phase, a second elastomer discontinuous phase, and thermally conductive filler, with the discontinuous phase dispersed through the continuous phase in the form of domains, and the thermally conductive filler also dispersed through the continuous phase. The second elastomer is wettable by the first elastomer. The second elastomer discontinuous phase domains are in sufficient number and of sufficient size, and there is a sufficient amount of the thermally conductive filler, so that the thermally conductive filler is concentrated sufficiently to be non-uniformly distributed through the fusing surface layer as a network.

17 Claims, 4 Drawing Sheets

FUSER MEMBER SYSTEM AND PROCESS

CROSS-REFERENCE TO CONCURRENTLY FILED APPLICATION

Filed concurrently with this application is the application entitled "Fuser Member Having Fusing Surface Layer That Includes Elastomer Continuous and Discontinuous Phases", Applicant's Docket Nos. H10539. This concurrently filed application is incorporated herein in its entirety, by reference thereto.

BACKGROUND OF THE INVENTION

The present invention relates to electrostatographic imaging and recording apparatus, and to assemblies in these apparatus for fixing toner to the substrates. The present invention relates particularly to fuser members, and fusing surface layers for fuser members, in the toner fixing assemblies.

Generally in electrostatographic reproduction, the original to be copied is rendered in the form of a latent electrostatic image on a photosensitive member. This latent image is made visible by the application of electrically charged toner.

The toner forming the image is transferred to a substrate, also referred to in the art as a "receiver", such as paper or transparent film, and fixed or fused to the substrate. Where heat softenable toners, for example, thermoplastic polymeric binders, are employed, the usual method of fixing the toner to the substrate involves applying heat to the toner, once it is on the substrate surface, to soften it, and then allowing or causing the toner to cool. This application of heat in the fusing process is preferably at a temperature of about 90° C.-220° C.; pressure may be employed in conjunction with the heat.

A system or assembly for providing the requisite heat and pressure is generally provided as a fusing subsystem, and customarily includes a fuser member and a support member. The various members that comprise the fusing subsystem are considered to be fusing members; of these, the fuser member is the particular member that contacts the toner to be fused by the fusing subsystem. The heat energy employed in the fusing process generally is transmitted to toner on the substrate by the fuser member. Specifically, the fuser member is heated; to transfer heat energy to toner situated on a surface of the substrate, the fuser member contacts this toner, and correspondingly also can contact this surface of the substrate itself. The support member contacts an opposing surface of the substrate.

Accordingly, the substrate can be situated or positioned between the fuser and support members, so that these members can act together on the substrate to provide the requisite pressure in the fusing process. In cooperating, preferably the fuser and support members define a nip, or contact arc, through which the substrate passes. Also as a matter of preference, the fuser and support members are in the form of fuser and pressure rollers, respectively. Yet additionally as a matter of preference, one or both of the fuser and support members have a soft layer that increases the nip, to effect better transfer of heat to fuse the toner.

During the fusing process toner can be offset from the substrate to the fuser member. Toner transferred to the fuser member in turn may be passed on to other members in the electrostatographic apparatus, or to subsequent substrates subjected to fusing.

Toner on the fusing member therefore can interfere with the operation of the electrostatographic apparatus and with the quality of the ultimate product of the electrostatographic process. This offset toner is regarded as contamination of the fuser member. Therefore, improving the release of the fuser member fusing surface layer, and thereby preventing or at least minimizing this contamination, is a desirable objective.

A factor in achieving sufficient fusing quality is providing sufficient heat transfer from the fusing surface layer of the fuser member to the substrate toner. This heat transfer is improved by increasing the fusing surface layer's thermal conductivity, which in turn is increased by incorporating thermally conductive filler in this layer. Particularly, high speed fusing of thermoplastic toners can require the presence of thermally conductive filler in the fusing surface layer, in order to increase the thermal conductivity of this layer.

Unfortunately, thermally conductive fillers are characterized by high surface energy; because of this property they serve as sites for toner to adhere to. These sites remove toner from the substrate and the displaced toner contaminates the fuser member surface. Polyester toners in particular are especially prone to interacting with high energy sites in this manner to cause such contamination. Moreover, increasing the thermally conductive filler content of the fusing surface layer, by providing more reactive sites for the toner, increases toner offset, and also increases contamination of the fuser member.

It would therefore be desirable, where thermally conductive filler particles are present in the fusing surface layer, to lessen, and ideally to minimize, the amount of the filler necessary to achieve a desired thermal conductivity, while also lessening, and ideally minimizing, the number of toner reactive sites in the fusing surface layer, and lessening toner contamination.

Particularly, changes as to the type, particle shape, and orientation of thermally conductive filler have been employed, for the purpose of optimizing thermal conductivity while minimizing toner contamination resulting from the filler's presence. In this regard, different methods for trying to increase thermal conductivity, without increasing the proportion by volume of thermally conductive filler, are known in the art. In one such method, the thermally conductive filler is provided in the form of high aspect ratio particles e.g., fibers, needles, and other elongated shapes.

However, one problem has been that such fillers lead to high viscosities. Another is that the high aspect ratio particles are less effective for conducting heat unless they are advantageously oriented.

Specifically, elongated particles are more efficient for conducting heat in the proper direction if they are at right angles to the fuser base, radially aligned, if the fuser base is a cylindrical core, belt on rollers, or a core-mounted plate. However, they are less efficient if they are positioned parallel to the core, axially aligned, if the fuser base is a core, a belt, or is core mounted as indicated.

It is difficult to provide a fusing surface layer with the desired perpendicular (radial) alignment of high aspect ratio thermally conductive filler. Application to the fuser base of the fusing surface layer coating material tends to leave too high a proportion of high aspect ratio filler in parallel (axial) alignment. Attempts have been made to rectify this disadvantageous positioning of high aspect ratio filler by magnetic alignment. However, this is a complicated process; and there are few fillers that respond sufficiently to magnetic fields. Accordingly, magnetic alignment has not been a very satisfactory solution to the difficulties inherent to using high aspect ratio thermally conductive filler.

With respect to the foregoing, it would therefore be desirable if thermal conductivity could be increased, with concurrent minimization of toner contamination, independently of the filler particle type, or shape, or orientation.

Still further, it would be desirable to increase the thermal conductivity of the fusing surface layer without changing the layer elastomer composition.

SUMMARY OF THF INVENTION

The objectives as indicated can be realized by means of the fuser member of the present invention. This fuser member is for toner fusing systems and processes, and comprises a base and a fusing surface layer. The fusing surface layer in turn comprises a first elastomer continuous phase, a second elastomer as a discontinuous phase, and thermally conductive filler. The second elastomer discontinuous phase is dispersed through the continuous phase in the form of domains, and the thermally conductive filler also is dispersed through the continuous phase.

The second elastomer discontinuous phase domains are in sufficient number, and of sufficient size, and the thermally conductive filler comprises a sufficient proportion by volume of the fusing surface layer, so that the thermally conductive filler is nonuniformly distributed through the fusing surface layer. Specifically, the thermally conductive filler is concentrated sufficiently so that this nonuniform distribution is in the form of a network. This form, or pattern, identified as a network, can also be considered as a lattice, or as a honeycomb configuration. In any event, the network through the fusing surface layer, formed by the thermally conductive filler, surrounds the second elastomer discontinuous phase domains i.e., these domains define the lattice spaces.

By being concentrated into the indicated network, the same amount of filler provides the fusing surface layer with a greater thermal conductivity. And this advantageous result is obtained without an increase in toner reactive sites, and so without an increase in toner offset and contamination.

The second elastomer is wettable by the first elastomer. Particularly, the second elastomer discontinuous phase domains are wettable by the first elastomer continuous phase. This wettability is a factor in causing the domains and the continuous phase to adhere together, and correspondingly it combats interfacial failure between these continuous and discontinuous elastomer phases.

With a first elastomer that swells from contact with release agent, the swell level of the first elastomer is greater than zero. With a second elastomer that swells from contact with release agent, the swell level of the second elastomer is greater than zero. Preferably where the first elastomer is a polyorganosiloxane elastomer, the swell level of the first elastomer is greater than zero. Also as matter of preference, where the second elastomer is a polyorganosiloxane elastomer, the swell level of the second elastomer is greater than zero.

In the case of a second elastomer that in fact does swell from release agent contact, yet another significant feature of the invention pertains to the second elastomer swell. Specifically, in contrast to inorganic and plastic fillers, the discontinuous phase domains swell from contact with release agent in liquid form, with the swell resulting from absorption of the release agent.

Second elastomer domains swollen with release agent will have some of the agent residing on the domains' surface, acting as a weak boundary layer. As this layer is removed during the fusing process, it is renewed by release agent coming up from within the swollen domains i.e., swollen by the release agent they contain.

These domains accordingly act as a reservoir for release agent. So as opposed to inorganic fillers, which provide high surface energy sites for toner to adhere to, where the second elastomer discontinuous phase domains of the invention are swellable and where release agent is employed they are characterized by a renewing boundary layer that combats toner offset.

DESCRIPTION OF THE INVENTION

Figure 1:
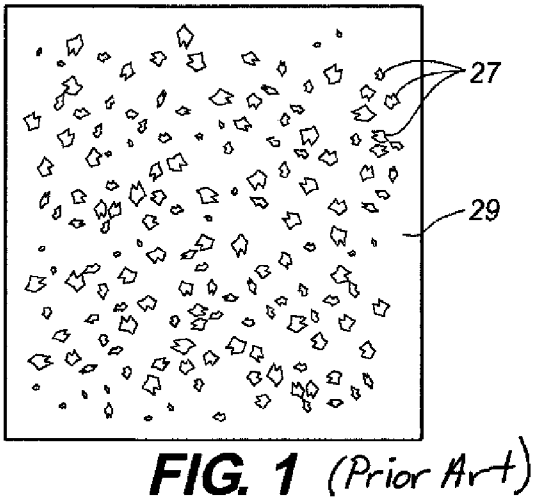
FIG. 1 (Prior Art)
FIG. 1 shows a portion of a fusing surface layer of the prior art.

Fusing or operating temperatures, or the temperature of the fusing process, are understood as being within the range of from about 90° C. to about 250° C. The preferred temperatures are generally within the range of from about 120° C. to about 200° C., more preferably from about 150° C. to about 185° C., still more preferably from about 160° C. to about 180° C.

Copolymers are understood as including polymers incorporating two different monomeric units, i.e., bipolymers, as well as polymers incorporating three or more different monomeric units, e.g., terpolymers, quaterpolymers, etc.

Elastomers are understood as including polymers that are nonelastomeric at room temperature but elastomeric at fusing or operating temperatures.

Polyorganosiloxanes are understood as including polydiorganosiloxanes i.e., having two organo groups attached to each of the polymer siloxy repeat units. Polyorganosiloxanes are further understood as including polydimethylsiloxanes.

Functional polyorganosiloxanes are understood as having functional groups on the backbone, connected to the polysiloxane portion, which can react with fillers present on the surface of the fuser member, or with a polymeric fuser member surface layer or component thereof. Functional polyorganosiloxanes further are understood as having functional groups such as amino, hydride, halo (including chloro, bromo, fluoro, and iodo), carboxy, hydroxy, epoxy, isocyanate, thioether, and mercapto functional groups.

The term "organo" as used herein, such as in the context of polyorganosiloxanes, includes hydrocarbyl, which includes "aliphatic", "cycloaliphatic", and "aromatic". The hydrocarbyl groups are understood as including the alkyl, alkenyl, alkynl, cycloalkyl, aryl, aralkyl, and alkaryl groups. Further, "hydrocarbyl" is understood as including both nonsubstituted hydrocarbyl groups, and substituted hydrocarbyl groups, with the latter referring to the hydrocarbyl portion bearing additional substituents, besides the carbon and hydrogen. Preferred organo groups for the polyorganosiloxanes are the alkyl, aryl, and aralkyl groups. Particularly preferred alkyl, aryl, and aralkyl groups are the $C_1$-$C_{18}$ alkyl, aryl, and aralkyl groups, particularly the methyl and phenyl groups.

The second elastomer is wettable by the first elastomer i.e., the first elastomer wets the second elastomer if the contact angle of the first elastomer on the second elastomer is about 10 degrees or less. Where this contact angle is zero, then the second elastomer is wettable by the first elastomer, and further, the second elastomer is spontaneously wettable by the first elastomer—i.e., the first elastomer spontaneously wets the second elastomer.

As another means for determining wetting, or wettability, the second elastomer is wettable by the first elastomer i.e., the first elastomer wets the second elastomer, if $$([\gamma_{2nd}-\gamma_{1st,2nd}]/\gamma_{1st})\geqq 0.98$$

wherein $\gamma_{1st}$=the first elastomer surface tension $\gamma_{2nd}$=the second elastomer surface tension $\gamma_{1st,2nd}$=the interfacial tension between the first elastomer and the second elastomer.

The foregoing method is useful, where the contact angle cannot be determined.

Unless stated otherwise, modulus is measured as tensile modulus of elasticity, using dynamic mechanical analysis, at a frequency equal to the frequency of the fuser member. The fuser member frequency pertains to the 360° rotation of the member, in the case of fuser members that operate in the fusing process by rotation (e.g., fuser members with bases in the form of cylindrical cores, or of belts on rollers, or of core-mounted plates) and in the case of other fuser members, to their equivalent movement.

Thermally conductive filler is filler, such as particulate material, having a thermal conductivity greater than five times the inherent thermal conductivity of the first elastomer continuous phase.

It is understood that size, when discussed with respect to filler, and when discussed with respect to second elastomer discontinuous phase domains, refers to particle and domain volume. Mean diameter or mean particle diameter, for the thermally conductive filler and for second elastomer domains refers to those that are in the particulate form.

Unless stated otherwise, molecular weights set forth herein are number average molecular weights ($M_n$), measured in Daltons.

Swellable elastomers are understood as being those elastomers, that swell from contact with release agent.

It is understood that the elastomer component of a fusing surface layer includes each elastomer in the layer. Where the layer has only a single elastomer, this elastomer is the layer's elastomer component. With the fusing surface layer of the invention including a first elastomer continuous phase and, in the form of domains, a second elastomer discontinuous phase, the elastomer component comprises both of these.

The fuser member of the invention includes a fuser base, and a fusing surface layer overlaying the fuser base. The fusing surface layer can reside directly on the fuser base. Alternatively, there can be one or more materials and/or layers, including one or more cushion layers, interposed between the fuser base and the fusing surface layer.

The fusing surface layer comprises a first elastomer as a continuous phase, a second elastomer dispersed through the continuous phase in the form of domains, and thermally conductive filler, also dispersed through the continuous phase. The thermally conductive filler is absent from the second elastomer domains.

Preferably, the second elastomer domains are uniformly distributed through the first elastomer continuous phase. Also as a matter of preference, the second elastomer domains are uniformly distributed through the fusing surface layer.

In the fusing surface layer there is a sufficient amount of the second elastomer domains, having sufficient size, to concentrate the thermally conductive filler sufficiently so that this filler is nonuniformly distributed through the fusing surface layer as a network, particularly, as a continuous network. This network can also be considered as a lattice, or a honeycomb configuration.

Second elastomer discontinuous phase domains are surrounded by the thermally conductive filler network. The lattice spaces are defined by second elastomer discontinuous phase domains.

The second elastomer domains preferably are larger, and have a greater volume than the thermally conductive filler. Also as a matter of preference, the second elastomer domains have a mean diameter where the second elastomer domains are in the particulate form, greater than the mean particle diameter of the thermally conductive filler.

It is the presence of thermally conductive filler in the first elastomer continuous phase in sufficient amount, and the dearth of this filler in the second elastomer domains, together with the domain and thermally conductive filler sizes as indicated, which cause this filler to be nonuniformly distributed in the fusing surface layer as a network. With the thermally conductive filler being concentrated in this manner, the fusing surface layer has a greater thermal conductivity than would be provided by the same thermally conductive filler, by the same type of the filler, in the same amount, the same proportion by volume of this filler in the layer, with the same particle shape and orientation if it were uniformly distributed through the fusing surface layer.

And this greater thermal conductivity is achieved without an increase in fusing surface layer reactive sites for toner adherence, and accordingly without increasing toner offset, and toner contamination. The thermal conductivity of the fusing surface layer is increased, without otherwise changing the thermally conductive filler, without increasing the fusing surface layer's amount, without increasing the proportion by volume, and without changing the filler type, particle shape, or orientation.

Accordingly, the fusing surface layer can be provided with a particular level of thermal conductivity using less thermally conductive filler. And with a lower content of this filler, there are fewer of the toner reactive sites, and so less contamination.

The foregoing effect as to thermal conductivity, and filler content and distribution, can be modeled using the equations for thermal conductivity of Nielsen, Ind. Eng. Chem. Fundam., Vol. 13, No. 1, Pages 17-20 (1974), which is incorporated herein in its entirety, by reference thereto. Nielsen provides a method for calculating the thermal conductivity of a two phase system i.e., a composition consisting of a continuous phase incorporating a dispersed phase.

According to Nielsen, both a thermal conductivity value for the continuous phase, and a thermal conductivity value for the material to be the dispersed phase, are inserted into the provided equations. These equations are used to calculate the thermal conductivity of a two phase system prepared from these components.

To perform the indicated modeling for the present invention, first the Nielsen equations are used to calculate the thermal conductivity of a two phase system made up of the thermally conductive filler dispersed in the first elastomer continuous phase. The resulting value is then itself inserted into the Nielsen equations as a continuous phase value i.e., is treated in these equations as if it were a thermal conductivity value for a continuous phase alone and the thermal conductivity of the second elastomer discontinuous phase domains is inserted into the equations as the dispersed phase thermal conductivity value. With these inserted values, the Nielsen equations are used to calculate the thermal conductivity of the 1st elastomer/2nd elastomer/filler dispersion i.e., the thermal conductivity of the composition that would be obtained by dispersing both the second elastomer discontinuous phase domains, and the thermally conductive filler, in the first elastomer continuous phase.

The parameters for the requisite calculations are set forth in Table 1 below.

TABLE 1

| Component | Thermal Conductivity | Volume Fraction | Aspect Ratio | Packing |
|---|---|---|---|---|
| First Elastomer | $K_{E1}$ | $\phi_{E1}$ | N/A* | N/A* |
| Second Elastomer | $K_{E2}$ | $\phi_{E2}$ | $A_{E2}$ | $\phi_{mE2}$ |
| Thermally Conductive Filler | $K_{TC}$ | $\cdot\ \phi_{TC}$** | $A_{TC}$ | $\cdot\ \phi_{mTC}$ |

*Not Applicable
**Thermally Conductive Filler Volume Fraction of First Elastomer Continuous Phase The thermal conductivity of the fusing surface layer of the invention, $K_{inv.}$, may be determined using the following equations:

$$K_{Inv.} = K_{E1Blend} \cdot \left[ \frac{1 + A_{E2} \cdot \phi_{E2} \cdot \left( \frac{\frac{K_{E2}}{K_{E1Blend}} - 1}{\frac{K_{E2}}{K_{E1Blend}} + A_{E2}} \right)}{1 - \phi_{E2} \cdot \left( 1 + \left( \frac{1 - \phi_{E2m}}{\phi_{E2m^2}} \right) \cdot \phi_{E2} \right) \cdot \left( \frac{\frac{K_{E2}}{K_{E1Blend}} - 1}{\frac{K_{E2}}{K_{E1Blend}} + A_{E2}} \right)} \right]$$

where $K_{E1Blend}$ is the thermal conductivity of the composite of the first elastomer and the thermally conductive filler, without the second elastomer; and $$K_{E1Blend} = K_{E1} \cdot \left[ \frac{1 + A_{TC} \cdot \phi_{TC} \cdot \left( \frac{\frac{K_{TC}}{K_{E1}} - 1}{\frac{K_{TC}}{K_{E1}} + A_{TC}} \right)}{1 - \phi_{TC} \cdot \left( 1 + \left( \frac{1 - \phi_{TCm}}{\phi_{TCm^2}} \right) \cdot \phi_{TC} \right) \cdot \left( \frac{\frac{K_{TC}}{K_{E1}} - 1}{\frac{K_{TC}}{K_{E1}} + A_{TC}} \right)} \right]$$

where $\phi_{TC}$ is not the volume fraction of thermally conductive filler, but the volume fraction of thermally conductive filler in the 1st elastomer/2nd elastomer/filler dispersion.

Figure 2:
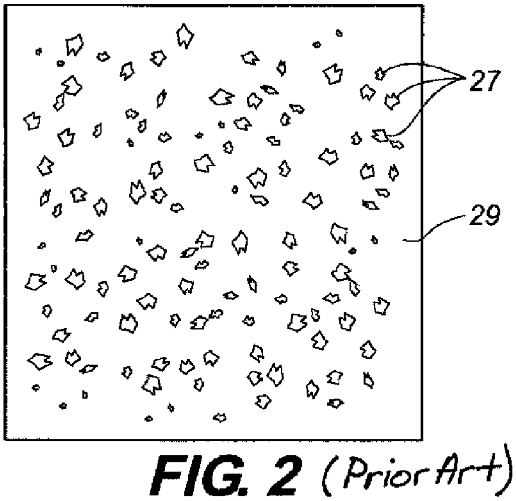
FIG. 2 (Prior Art)
FIG. 2 shows a portion of another fusing surface layer of the prior art.

FIG. 1 shows a portion of a fusing surface layer of the prior art, with $Fe_2O_3$ filler particles 27 uniformly dispersed through silicone elastomer continuous phase 29. FIG. 2 shows a portion of another prior art fusing surface layer, also with $Fe_2O_3$ filler particles 27 uniformly dispersed through silicone elastomer continuous phase 29. However, the FIG. 2 layer has a lower concentration of the filler than does the FIG. 1 layer, because with the fusing surface layer of FIG. 2, a greater proportion by volume of continuous phase elastomer relative to the total volume of the filler is used to prepare this FIG. 2 layer, than is used to prepare the FIG. 1 layer.

Rather than by more elastomer being employed to prepare the FIG. 2 layer, the same relative proportions of elastomer and filler in this layer could instead have been achieved in this layer by means of less thermally conductive filler being used. With either method, this fusing surface layer of FIG. 2 has a lower content by volume of the filler than does the FIG. 1 fusing surface layer. By virtue of its filler also being uniformly distributed, but in lower concentration than that of the FIG. 1 layer, the FIG. 2 layer correspondingly has a lower thermal conductivity than does the layer of FIG. 1.

Figure 3:
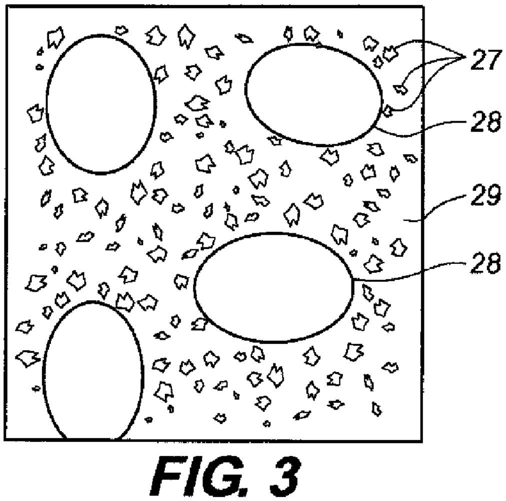
FIG. 3 shows a portion of a fusing surface layer of the invention.

FIG. 3 shows a portion of a fusing surface layer of the invention, with $Fe_2O_3$ filler particles 27 and silicone elastomer particles, the silicone elastomer particles being depicted as idealized domains 28, dispersed through silicone elastomer continuous phase 29. Though the shape of the silicone elastomer particles is idealized, FIG. 3 accurately shows that they are of larger size, have a greater volume, and a greater mean particle diameter than the filler particles.

In accordance with the invention, in the FIG. 3 layer the filler has been concentrated into nonuniform distribution through the layer, in the form of a network surrounding the silicon elastomer particles. And this configuration is effected because the silicone elastomer particulate is present in sufficient size relative to the filler and in sufficient amount to form the network pattern.

The elastomer components of the FIGS. 2 and 3 layers comprise the same percent by volume of their respective layers. Specifically, the FIG. 3 layer has the same greater proportion of elastomer over that of the FIG. 1 layer as does the layer of FIG. 2. However, with the fusing surface layer of FIG. 3, this added elastomer is provided by the silicone elastomer particles, rather than by more of the continuous phase silicone elastomer, as is done with the FIG. 2 layer.

In fact, a comparison the layer portions represented in FIGS. 2 and 3 will confirm that the FIG. 3 layer not only has the same proportion by volume of thermally conductive filler as the FIG. 2 layer, but that the number, size and shape of the filler particles is the same in the FIG. 3 layer as in the FIG. 2 layer. The difference is that in the FIG. 3 layer, the positioning of the filler particles has been changed by the presence of the silicone elastomer particles. And because of the indicated concentration of the filler into the resulting network, the FIG. 3 layer has a higher thermal conductivity than the FIG. 2 layer, without an increase in toner offset or contamination.

The first and second elastomers may also be referred to as first and second polymers, respectively. Particularly, polymers to be cured to form the first and second elastomers may be referred to as curable first and second polymers, respectively.

In this regard, the first elastomer is prepared by curing the corresponding curable first polymer, and the second elastomer likewise is prepared by curing the corresponding curable second polymer. In both cases, the curing affects crosslinking, to provide the resulting elastomer.

The crosslinking may be accomplished by suitable means, as are known in the art. For instance, reactive polymer and crosslinker can be reacted to provide the requisite crosslinked elastomer or crosslinking can be affected by interreaction of a reactive polymer e.g., by reaction between reactive chains of the polymer without use of a crosslinker.

The first and second elastomers preferably are heat stable at temperatures of up to at least about 120° C., more preferably up to at least about 130° C., and still more preferably up to at least about 150° C. Particularly, the first and second elastomers preferably are heat stable at fusing or operating temperatures. This heat stability entails the absence of degradation, decomposition, sublimation, and release of byproducts.

Among the elastomers that are suitable as first and second elastomers are perfluoropolyethers, fluoroelastomers, and silicones, such as fluorosilicones. The silicone, or polyorganosiloxane, elastomers are preferred, and the polydimethylsiloxane elastomers are especially preferred.

Particularly, among the silicone elastomers that may be used are vinyl addition cure silicone elastomers, condensation cure silicone elastomers, and peroxide cure silicone elastomers. Of these, the polyorganosiloxane elastomers are preferred, and the polydimethylsiloxane elastomers are especially preferred. Further, of the vinyl addition cure silicone elastomers, condensation cure silicone elastomers and peroxide cure silicone elastomers, the vinyl addition cure silicone elastomers and the condensation cure silicone elastomers are preferred.

A vinyl addition cure silicone elastomer that may be used is Silastic™-J silicone, from Dow Corning Corporation, Midland, Mich. This is a room temperature vulcanizate (RTV) silicone elastomer, and has a 60 Shore A durometer. A condensation cure silicone elastomer that may be used is LS4340-103 silicone, from Emerson & Cuming ICI, Billerica, Mass.; this is a RTV silicone elastomer, and has a 20 Shore A durometer. A condensation cure silicone elastomer composition that may be used is EC4952, also from Emerson & Cuming ICI, which has a 65 Shore A durometer, and comprises 64 percent by volume $Al_2O_3$, 0.8 percent by volume $Fe_2O_3$, and the remainder condensation cure RTV silicone elastomer. These three commercially available compositions are suitable both as first elastomers and as second elastomers.

The second elastomer is wettable by the first elastomer i.e., the first elastomer wets the second elastomer. Preferably, the second elastomer is spontaneously wettable by the first elastomer i.e., the first elastomer spontaneously wets the second elastomer.

The first elastomer and second elastomer are provided so that the former, as the continuous phase, does not readily debond from the domains of the latter and so the reinforcement of the fusing surface layer, provided by the second elastomer domains, is maintained under stress. The indicated wetting, or wettability, feature maintains the requisite adhesion between the first and second elastomers so that the continuous phase and the domains bind together and resist phase separation. Therefore, this compatability of the first elastomer and the second elastomer is advantageous for preserving the structure and the configuration of the fusing layer specifically, for preserving the relationship between the continuous and discontinuous phases.

Chemical similarity of the first and second elastomers can be a factor in providing their wetting or wettability feature. And where this chemical similarity indeed is such a factor, the greater the chemical similarity, the greater the adhesion and reinforcement can be provided.

In this regard, preferably at least about 15 percent of the second elastomer total repeat units and at least about 15 percent of the first elastomer total repeat units are the same monomeric unit. Stated more succinctly, preferably at least about 15 percent of the first and second elastomer total repeat units are the same monomeric unit.

Expressed in the same manner, preferably at least about 25 percent, more preferably at least about 50 percent, still more preferably at least about 75 percent, still more preferably at least about 95 percent, still more preferably at least about 98 percent, still more preferably at least about 99 percent of the first and second elastomer total repeat units are the same monomeric unit. And yet, more preferably, from about 80 percent or about 90 percent or about 95 percent to about 98 percent or about 99 percent or about 100 percent of the first and second elastomer total repeat units are the same monomeric unit.

Stated in terms of the foregoing criteria, where the second elastomer is a crosslinkable poly(dimethyl(65%)-diphenyl (35%))siloxane and the first elastomer is a curable polydimethylsiloxane, 65 percent of the first and second elastomer total repeat units are the same monomeric unit, specifically, the dimethylsiloxy unit.

Repeat units that are involved in crosslinking are not included in determining proportions of identical repeat units in determining the percentages of total repeat units that are the same monomeric unit.

Particularly, at operating conditions or at the temperature of the fusing process or at the fusing temperature the modulus of the second elastomer discontinuous phase domains may be higher than, lower than, equal to the modulus of the first elastomer continuous phase.

Where the modulus of the second elastomer discontinuous phase domains is higher than the modulus of the first elastomer continuous phase, the discontinuous phase serves to provide reinforcement under stress. The reinforcement provided by the higher modulus discontinuous phase is also an advantageous feature for preserving the structure and configuration of the fusing layer, specifically, for preserving the relationship between the continuous and discontinuous phases.

For second elastomers that swell from contact with release agent, and particularly in the case of polyorganosiloxane elastomers employed as second elastomers, the modulus of the second elastomer discontinuous phase domains preferably is about $2.3\times10^6$ Pa or greater. Particularly at fuser operating conditions, or at the temperature of the fusing process, or at the fusing temperature, for the second elastomers as indicated, the modulus of the second elastomer discontinuous phase domains preferably is about $2.3\times10^6$ Pa or greater.

For first elastomers that swell from contact with release agent, and particularly in the case of polyorganosiloxane elastomers employed as first elastomers, the modulus of the first elastomer continuous phase preferably is about $2.5\times10^6$ Pa or less. Particularly at fuser operating conditions, or at the temperature of the fusing process.

The ratio of the modulus of the second elastomer discontinuous phase domains to the modulus of the first elastomer continuous phase is preferably is not more than about 100:1, more preferably not more than about 20:1.

As to the fusing surface layer taken in its entirety, this layer preferably has a modulus of from about $6\times10^5$ Pa to about $2\times10^7$ Pa. Particularly at fuser operating conditions, or at the temperature of the fusing process, or at the fusing temperature, the fusing surface layer preferably has a modulus of from about $6\times10^5$ Pa to about $2\times10^7$ Pa.

Further as to elastomers that swell from contact with release agent, elastomer swell levels are calculated from the increase that would result in any of the three dimensions i.e., height, length, or width of a sample of the elastomer, if the sample were treated with an excess amount of a release agent in liquid form. In this regard, an excess amount means more of the release agent than the sample can absorb so that treatment with the excess amount means contacting the sample with enough of the release agent so that the sample achieves maximum release agent absorption and still leaves an amount of the release agent unabsorbed.

The swell level of a thusly swellable elastomer is obtained from dividing the indicated increase in the length of the chosen dimension i.e., the increase that would result from the treatment with excess release agent by the original length of this dimension, without the release agent treatment. Swell level can be expressed as a percentage and in this form is referred to as percent swell.

Swell levels are determined for the swellable elastomers in pure form. For a swellable elastomer containing filler, swell level is based on the elastomer portion alone. Determining the swell level of a swellable elastomer that includes filler from an actual sample of the filled elastomer can be accomplished by mathematically accounting for the affect of the nonswelling filler.

For a swellable elastomer including a portion of uncrosslinked polymer i.e., sol, the swell level is based on the elastomer with the sol removed. So once again as to actual practice, determining swell level from a sample can be accomplished by extracting the sol portion with a solvent and calculating the true swell of the elastomer, absent the sol, mathematically.

Where the first elastomer is a swellable elastomer, the swell level of the first elastomer is greater than zero, and where the second elastomer is a swellable elastomer, the swell level of the second elastomer is greater than zero. Preferably where the first elastomer is a polyorganosiloxane elastomer, the swell level of the first elastomer is greater than zero. Also as matter of preference, where the second elastomer is a polyorganosiloxane elastomer, the swell level of the second elastomer is greater than zero.

Further in the case of swellable elastomers, the swell level of the second elastomer may be higher than, lower than or equal to the swell level of the first elastomer. Particularly as to the polyorganosiloxane first and second elastomers, the swell level of the second elastomer may be higher than, lower than or equal to the swell level of the first elastomer. It is understood that these swell level comparison are based upon treatment of both the first elastomer and the second elastomer with the same release agent.

Preferably, where the first and second elastomers are swellable elastomers, the swell level of the first elastomer is from about 0.3 to 0.01. Accordingly, where the first and second elastomers are swellable elastomers, the percent swell of the first elastomer is from about 30 percent to about 1 percent.

Preferably, where the first and second elastomers are swellable elastomers, the ratio of the second elastomer swell level to the first elastomer swell level is from about 0.8:1 to about 0.05:1.

Just as swell level can be identified as a percentage, this ratio also can be referred to in that form. So expressed as a percentage, where the first and second elastomers are swellable elastomers, preferably the swell level of the second elastomer is from about 80 percent to about 1 percent of the swell level of the first elastomer. As with swell level comparison, it is also understood that swell level ratio and, therefore, of course, the corresponding percentage, likewise are based upon the treatment of both the first and the second elastomer with the same release agent.

Crosslink density affects the hardness, the modulus, as well as the swell in the case of swellable elastomers of both the first elastomer and the second elastomer of both the discontinuous phase domains and the continuous phase. Specifically, varying crosslink density varies hardness, modulus and the swell of swellable elastomers.

A higher crosslink density means a higher modulus or a greater hardness, and in the case of swellable elastomers also means a lower swell level for the elastomer. So increasing crosslink density increases modulus, hardness, and for swellable elastomers reduces swell level.

Conversely, a lower crosslink density means a lower modulus or a lower hardness, and as to swellable elastomers also means a higher swell level. So lowering crosslink density decreases modulus, hardness, and for swellable elastomers increases swell level.

Crosslink density can also be expressed as molecular weight between crosslinks. A higher crosslink density means lower molecular weight between crosslinks, and a lower crosslink density means a higher molecular weight between crosslinks.

For preparing the fusing surface layer of the invention, the second elastomer may be provided already in cured elastomer form. Employed as a cured material, the second elastomer may be provided already in final form e.g., as particles, to serve as the domains dispersed in the first elastomer continuous phase. The second elastomer discontinuous phase material may be provided in particulate form and added to curable first polymer with the thermally conductive filler, as well as any other filler, additives, adjuvants, and other materials being added appropriately to the curable first polymer. The resulting composition comprises the fusing surface layer material for preparing the fusing surface layer.

Alternatively, as a cured material, the second elastomer may be provided in bulk form e.g., as a slab or otherwise solid material. This material may first be reduced to the desired particulate by suitable means, such as grinding, and then combined with curable first polymer, thermally conductive filler and whatever additional components are being employed to provide the fusing surface layer material.

In this bulk form the second elastomer may be combined with the curable first polymer and both polymers together subjected to milling or grinding to produce second elastomer particulate in final form, dispersed in the still to be cured first polymer. Here, it is preferable that the thermally conductive filler, as well as any other filler, additives, adjuvants, and other materials not be added until after the milling or grinding. However, as to any of these components whose inclusion in this milling or grinding will not interfere with obtaining the requisite fusing surface layer material than such one or more components also may, together with the bulk second elastomer and curable first polymer, be milled or ground as indicated.

Where the second elastomer is provided already in cured elastomer form already in particulate form or in bulk form subsequently reduced to particulate, crosslinking of this elastomer will already have been affected before it comes into contact with the thermally conductive filler. For this reason, the thermally conductive filler is excluded from and is prevented from being incorporated into the second elastomer particulate.

Rather than being already in cured elastomer form, the second elastomer may be provided as a curable polymer, to be crosslinked to form the second elastomer. However, in the process of preparing the fusing surface layer, provision must be made to prevent thermally conductive filler from being incorporated in the second elastomer discontinuous domains.

A means for effecting the requisite prevention or exclusion is to add the thermally conductive filler to the curable first polymer before the addition of the curable second polymer, and to provide that the thermally conductive filler is fully wet by the curable first polymer before the addition of the curable second polymer. Before the curable second polymer is added to the curable first polymer, the previously added thermally conductive filler is sufficiently wet by the curable first polymer so that the curable second polymer, once added, cannot itself wet the filler.

This wetting of the filler with the curable first polymer is employed for the purpose of keeping the filler in the curable first polymer and out of the curable second polymer, and upon the curing of these polymers keeping the filler in the elastomer continuous phase, and out of the second elastomer discontinuous phase domains. Prior to its addition to the curable first polymer, the thermally conductive filler is suitably treated, particularly surface treated to increase its compatibility with this polymer, and thereby facilitate wetting of the filler by the curable first polymer.

In the case of second elastomer being used in curable polymer form, it may be provided as a curable liquid or gum. Employed in curable form, the second polymer is combined in this state with the curable first polymer, and cured by the curing of the fusing surface layer, to provide the discontinuous phase domains. This curing, besides affecting crosslinking of the curable first polymer, also affects crosslinking of the curable second polymer, to form the second elastomer.

Where curable second polymer is used, the discrete domains i.e., separate from and dispersed through the first elastomer continuous phase are formed due to the immiscibility of the first and second curable polymers. This immiscibility may be caused by a difference in chemical composition between the first and second polymers, such as one having repeat units that are not present in the other; an example of such a difference would be a crosslinkable poly(dimethyl(85%)-diphenyl(15%)siloxane second polymer, dispersed in a curable polydimethylsiloxane first polymer.

In a preferred embodiment, preformed silicone elastomer particulate, already cured, is employed as the second elastomer in preparing the fusing surface layer. The silicone elastomer particles are crosslinked particles of polyorganosiloxane, preferably polydiorganosiloxane, particularly preferably polydimethylsiloxane, elastomer.

The silicone elastomer particulate can be prepared by emulsion polymerization, or from bulk silicone by grinding, or otherwise reducing the material to discrete particles. Particularly, polydimethylsiloxane particles can be obtained using condensation or addition cure methods. Preparation involves the reaction of a vinyl dimethyl terminated polydimethylsiloxane having a number average molecular weight of from about 300 to about 20,000, and either a polymethylhydrosiloxane or a methyl hydro, dimethylsiloxane copolymer, having a number average molecular weight of from about 110 to about 3,000; also as a matter of preference, the ratio of hydride to vinyl groups is from about 1:1 to about 2:1.

The silicone elastomer particles can be prepared in accordance with the procedures set forth in U.S. Pat. No. 6,281,279; the silicone elastomer particles as disclosed in U.S. Pat. No. 6,281,279 can be used. This patent is incorporated herein in its entirety, by reference thereto.

Commercially available silicone particulates that are suitable for the invention include X-52-854, X-52-875, KMP597, and KMP598, from Shin-Etsu Silicones of America, Inc., Akron, Ohio.

Addition cure silicone elastomers typically employ a platinum catalyst;

condensation cure silicone elastomers, a tin catalyst. Tin catalysts will poison platinum catalysts but the reverse is not true. As to employing an already cured second elastomer with a curable first polymer, an addition cure silicone second elastomer may be used with a condensation cure silicone first elastomer but a condensation cure silicone second elastomer may not be used with an addition cure silicone first elastomer unless provision has been made to prevent poisoning of the addition cure catalyst by the condensation cure catalyst.

In a particularly preferred embodiment, preformed polydimethylsiloxane particulate is employed as the second elastomer together with a condensation curable silicone as the first elastomer.

The discontinuous phase domains preferably have a surface energy of about 35 dynes/cm or less. As a matter of particular preference, the second elastomer has a surface energy of about 30 dynes/cm or less.

For polyorganosiloxane discontinuous domains, the polyorganosiloxane preferably has a molecular weight between crosslinks of from about 300 to about 10,000—particularly in the case of polydimethylsiloxane discontinuous domains, and particularly in the case of polyorganosiloxane, especially polydimethylsiloxane, particles or particulate, such as preformed particles or particulate.

In a preferred embodiment all of the first and second elastomer total repeat units are the same monomeric unit, the modulus of the second elastomer discontinuous phase domains is equal to the modulus of the first elastomer continuous phase, and in the case of the swellable elastomers, the swell level of the second elastomer is equal to the swell level of the first elastomer.

As a matter of particular preference, the first elastomer continuous phase and second elastomer discontinuous phase domains are the same elastomer or are as close to being the same elastomer as is possible. In such instance, the first elastomer continuous phase and the second elastomer discontinuous phase domains, together provide an elastomer component that is the same, or at least almost the same, as what would be provided by the first elastomer alone.

Therefore, a fusing surface layer with such first and second elastomers, and thermally conductive filler, will comprise an elastomer component which is the same, or at least almost the same composition as the elastomer component of a layer that includes the first elastomer and the filler, but not the second elastomer except that in the layer which in fact does contain the second elastomer the filler will be concentrated into non-uniform distribution through the layer, as a network, by the presence of the second elastomer domains.

In this manner, the thermally conductive filler configuration of the present invention is provided, with the resulting benefits as indicated, while the composition of the elastomer component is not changed. And one means for providing that the first and second elastomers are the same elastomer, is by using, as the second elastomer for preparing the fusing surface layer of the invention, an elastomer already in cured form whether in particulate form, in bulk form subsequently reduced to particulate with this second elastomer having been obtained by curing the same curable polymer as used to prepare the first elastomer.

As to the preference that the first elastomer continuous phase and second elastomer discontinuous phase domains comprise the same elastomer, it is preferred that:

- the first elastomer repeat units and the second elastomer repeat units comprise the same monomeric units;
- the first elastomer and the second elastomer have the same molecular weight between crosslinks;
- crosslinking occurs at the same monomeric units of the first elastomer and the second elastomer; and
- the first elastomer crosslinks and the second elastomer crosslinks have the same molecular structure.

Among the curing systems for producing first and second elastomer crosslinks are peroxide, vinyl addition, hindered diamine, and bisphenol curing systems. An example of first and second elastomers having the same crosslink molecular structure would be where both are peroxide cure elastomers such as, peroxide cure silicone elastomers.

Types of thermally conductive fillers that are suitable include $SnO_2$, SiC, CuO, ZnO, FeO, $Fe_2O_3$, BN, crystalline $SiO_2$ (quartz), $TiO_2$, and $Al_2O_3$. One or more of these may be used. Preferred thermally conductive fillers are $Al_2O_3$ and $Fe_2O_3$.

The thermally conductive fillers may be in one or more of any suitable shapes, irregular, as well as in the form of spheroids, platelets, flakes, powders, ovoids, needles, fibers and the like.

The second elastomer discontinuous phase domains preferably have a mean diameter in the case of the particulate of from about 1 micron to about 100 microns. In a particularly preferred embodiment, the second elastomer discontinuous phase domain mean diameter the mean particle diameter is from about 8 microns to about 60 microns.

The second elastomer discontinuous phase domains can comprise from about 5 percent to about 70 percent by volume, of the fusing surface layer. Further, the second elastomer discontinuous phase domains can comprise up to about 5 parts, to about 150 parts per 100 parts by weight of the first elastomer continuous phase.

Preferably the thermally conductive filler has a mean particle diameter of from about 0.1 microns to about 50 microns.

The content by volume, the proportion by volume of the thermally conductive filler in the fusing surface layer must be sufficient for this filler to provide the requisite network through the layer. It is also preferred, however, that the thermally conductive filler not comprise too great a proportion by volume of the fusing surface layer.

Accordingly, the thermally conductive filler preferably comprises not more than about 45 percent by volume, more preferably not more than about 35 percent by volume, still more preferably not more than about 30 percent by volume, still more preferably not more than about 20 percent by volume of the fusing surface layer.

Where the goal is to achieve a particular degree of increase in the thermal conductivity of the fusing surface layer, the lower the percentage by volume of the thermally conductive filler that is present in the layer, the higher the percentage by volume of the second elastomer discontinuous phase domains that is required. Conversely, the higher the percentage by volume of the thermally conductive filler in the layer, the lower the percentage by volume of the second elastomer discontinuous phase domains that is required.

The ratio of the mean particle diameter of the second elastomer discontinuous phase domains to the mean particle diameter of the thermally conductive filler, is preferably greater than 1:1, more preferably greater than about 2:1, still more preferably greater than about 5:1, and still more preferably greater than about 10:1. At lower volume levels of the filler, a larger ratio of domain to filler size is more desirable. In this regard, where the thermally conductive filler comprises about 20 percent by volume or less of the fusing surface layer, the indicated ratio preferably is greater than about 2:1, more preferably greater than about 5:1, and still more preferably greater than about 10:1.

The fusing surface may include, in addition to the second elastomer discontinuous phase domains and the thermally conductive filler, one or more additional fillers dispersed through the first elastomer continuous phase, and one or more other additives and adjuvants as long as such additional fillers, additives, and adjuvants do not interfere with the intended structure, configuration, and function of the fusing surface layer, and as long as they do not affect the integrity of the layer, or significantly interfere with an activity intended to occur in the fusing surface layer, such as elastomer crosslinking.

Different such additional fillers may be used for such purposes as improving toner offset and release properties of the fusing surface layer, controlling material properties such as wear resistance and surface roughness, modifying hardness, and imparting other characteristics, such as desired mechanical properties, to the fusing surface layer. Among the eligible additional fillers are reinforcing fillers.

Particular additional fillers that are suitable include inorganic fillers such as amorphous silica, and plastic fillers. The plastics are understood as including noncrosslinked plastics, and also as including resins, particularly inelastic resins, and crosslinked resins. Fluoroplastics are particularly preferred, as are fluororesins, or nonelastomeric fluorocarbons. Fluororesins that are suitable include polytetrafluoroethylenes (PTFE), and fluorinated ethylene propylenes (FEP), including copolymers of tetrafluoroethylene and hexafluoropropylene, as well as copolymers of tetrafluoroethylene and ethylene, and copolymers of tetrafluoroethylene and perfluoroalkyl vinyl ether (PFA). Preferably the plastics, and particularly the fluororesins, have a number average molecular weight of from about 1,000 to 1,000,000.

The shapes indicated as being suitable for the thermally conductive fillers are also appropriate for these additional fillers.

Suitable examples of further adjuvants and additives that may be used include crosslinking agents, processing aids, accelerators, polymerization initiators, and coloring agents.

These additional fillers, additives, and adjuvants, where present, are provided in amounts and/or proportions, and the fillers are provided in sizes, as are generally known or as can be determined without undue experimentation by those of ordinary skill in the art. Here also, as to such amounts, proportions, and sizes, the proviso is that they do not interfere with the intended structure, configuration, and function of the fusing surface layer, and that they do not affect the integrity thereof, or significantly interfere with an activity intended to occur in this layer.

As has been stated, thermally conductive filler is absent from the second elastomer discontinuous phase. However, as with the first elastomer continuous phase, the second elastomer discontinuous phase domains may contain one or more nonthermally conductive fillers, as long as such fillers do not interfere with the intended structure, configuration, and function of the fusing surface layer, and as long as they do not affect the integrity thereof, or significantly interfere with an activity intended to occur in this layer, such as elastomer crosslinking. Nonthermally conductive fillers that may be used include nonthermally conductive inorganic fillers, and plastic fillers as indicated.

Such filler, where incorporated in the second elastomer, preferably has a mean particle diameter that is not more than about 25 percent of the mean diameter of the second elastomer domains. It preferably comprises not more than about 50 percent by volume of the second elastomer discontinuous phase domains. Still more preferably, filler as indicated comprises from about 0 percent by volume to about 50 percent by volume, of the second elastomer discontinuous phase domains. Also as a matter of preference, the discontinuous phase domains comprise less than about 20 percent by volume of this filler, more preferably less than about 10 percent by volume filler.

In a particularly preferred embodiment, an addition cure polydimethylsiloxane particulate from which filler is absent and which has a mean particle diameter of about 40 microns, and a modulus of about $5.3\times10^6$ Pa at fuser operating conditions, together with a condensation cure polydimethylsiloxane first elastomer having a modulus of $1\times10^6$ Pa at fuser operating conditions and with $Fe_2O_3$ filler, having a mean particle diameter of about 2.5 microns, also dispersed through the first elastomer. In this particularly preferred embodiment, the polydimethylsiloxane particulate and the $Fe_2O_3$ filler comprise 25 and 15 percent by volume, respectfully, of the fusing surface layer.

Particularly with respect to the toner fusing system and the toner fusing process—and correspondingly the fuser member—of the invention, the fuser base may be any of those as are known in the art. As a suitable embodiment, the fuser base may be a core in the form of a cylinder or a cylindrical roller, particularly a hollow cylindrical roller. In this embodiment the fuser base may be made of any suitable metal, such as aluminum, anodized aluminum, steel, nickel, copper, and the like. Also appropriate are ceramic materials and polymeric materials, such as rigid thermoplastics, and thermoset resins with or without fiber enforcement. Preferably the roller is an aluminum tube or a flame sprayed aluminum coated steel tube.

Alternatively, the fuser base may be a plate. Materials suitable for the core may also be used for the plate.

One embodiment of a fuser base in the plate form is a curved plate mounted on a larger cylindrical roller that is, larger than a cylindrical roller which itself is employed as a fuser core. Being curved, the plate accordingly has the shape of a portion of a cylinder. Additionally, the plate can be removably mounted on the cylindrical roller, so that the plate can be replaced without also requiring replacement of the roller. In this embodiment, the properties discussed herein with reference to the fuser base pertain only to the portion of the cylindrical roller occupied by the attached plate; the rest of this roller is not involved in the fusing of toner to substrate.

As yet another alternative, the fuser base may be a belt, particularly an endless flexible belt. A thin belt made of a suitable metal, such as those indicated for the core and plate forms; the belt may also be made of a polyamide or a polyimide, particularly a heat resistant polyamide or polyimide. A polyimide material appropriate for the belt is commercially available under the trademark Kapton, from DuPont High Performance Films, Circleville, Ohio.

Preferably the belt is mounted on rollers, which can be cores of the type as discussed herein. As a matter of preference two rollers are utilized with the belt, each of these two rollers defining a different one of the curves around which the belt passes.

A support member for the fusing system and process likewise may be any of those as are known in the art; particularly, it can be a backup roller, also referred to as a pressure roller. The support member can be in the form of a roller, plate, or belt, in the same manner as is suitable for the fuser base; cores suitable for the fuser member may also be used for the support member. Where the support member is a belt, preferably it is mounted on rollers, in the same manner as for the fuser base in the form of a belt.

In any of the indicated forms, the support member may have mounted thereon a cushion for forming the nip with the fuser member. Suitable cushion materials include those having at least some degree of temperature resistance, such as silicone and EPDM elastomers. In the absence of yet a further layer in turn being mounted on the cushion, this cushion also serves to contact the substrate, and accordingly to cooperate with the fuser member.

Alternatively or in addition to the cushion, the support member may have mounted thereon a thin fluoroplastic surface layer, such as a Teflon or PFA layer, overlaying the surface that cooperates with the fuser member. Where both the cushion and the thin fluoroplastic surface layer are present on the support member, the cushion is situated between the support member and the surface layer.

Preferably the fuser base is in the form of a cylindrical roller, with the fuser member correspondingly in the form of a roller specifically, a fuser roller. Also as a matter of preference, the support member comprises a backup roller.

Further in the toner fusing system and process of the invention, internal heating and/or external heating may be employed. Heating means as are known in the art, such as appropriate heating members, are suitable. Preferably, the means of providing heat for fusing toner and substrate comprise the heating of the fuser member by one or more external and/or internal heating sources by one or more heating members and transmission of this heat from the fuser member to the toner, or to both toner and substrate preferably by contact.

As used herein with reference to heating, the terms "external" and "internal" pertain to positioning with respect to the fuser base. In this regard, "external" indicates location outside of the fuser base, and "internal" means residence within the fuser base.

Correspondingly, an external heating member is outside the fuser member, and therefore outside the fuser base. It thusly provides heat to the fusing surface layer from outside the fuser member.

Consistent with the foregoing, an internal heating member is inside the fuser base, and correspondingly inside the fuser member. It accordingly provides heat to the fusing surface layer from within the fuser member.

Further as to the matter of heating, the term "primary" refers to providing more than 50%, and up to and including 100%, of the heat energy employed for fusing toner to the substrate on which it resides. Correspondingly, the term "secondary" refers to providing less than 50% of the heat energy.

Where there are one or more materials and/or layers, including one or more cushion layers, interposed between the fuser base and the fusing surface layer, they may be those as are known in the art. Where there is at least one cushion layer, the at least one cushion layer can include one or more thermally conductive cushion layers and/or one or more thermally nonconductive cushion layers. Generally, the thickness of the at least one cushion layer is about 20 millimeters or less, preferably from about 1 to about 10 millimeters.

Among the materials which can be used for the at least one cushion layer are suitable silicone elastomers, such as appropriate thermally conductive silicone elastomers and thermally nonconductive silicone elastomers. Addition cure, condensation cure, and peroxide cure silicone elastomers can all be used, with addition cure silicone elastomers and condensation cure silicone elastomers being preferred.

Further, silicone elastomers formulated as liquid injection moldable (LIM), high temperature vulcanizate (HTV), and RTV silicone elastomers can be used. RTV and LIM silicones are preferred. Two particular silicone elastomers which may be used are Silastic™-J silicone and EC4952 silicone.

In a process which may be used for application of at least one cushion layer, the fuser base optionally can first be degreased and surface roughened. If these functions are performed, they may be accomplished by grit blasting. Except as discussed otherwise herein, the fuser base surface, whether or not initially degreased and roughened, is primed with conventional primer, such as Dow™ 1200 RTV Prime Coat primer, from Dow Corning Corporation, and material for forming a cushion is subsequently applied thereto.

To form a silicone cushion layer, silicone elastomer is molded, particularly by injection, or extruded or cast onto the fuser base to the desired thickness. Curing is then effected. For a RTV silicone, this is accomplished by allowing it to sit at room temperature.

After curing, the silicone layer is subjected to a post cure, which improves compression set resistance. Typically a post cure is conducted at a temperature of about 150-240° C. for a period of about 4-48 hours.

Each silicone cushion layer is subjected to cure, and preferably also to post cure, before application of the next layer, except possibly in the case of the last silicone cushion layer to be laid down. Specifically, for preparation of the fusing surface layer, the curable first polymer—containing the curable second polymer or cured second elastomer domains, as well as any filler, additives, adjuvants, or other materials being employed—is laid down on the indicated last applied cushion layer.

If heating is required for the curing of this fusing surface layer material e.g., for curing the curable first polymer and/or the curable second polymer if such is employed then there is no post cure of the last applied silicone cushion layer prior to application of the fusing surface layer material; rather, the heat curing of the fusing surface layer serves as the post cure for the silicone cushion layer on which it is deposited.

Delaying the post cure of the last cushion layer in this manner allows maximum adhesion between the cushion and the fusing surface layer. However, if curing of the fusing surface layer is affected without heat, then the last applied silicone cushion layer is subjected to post cure before the fusing surface layer material is laid down.

Before the fusing surface layer material is applied, the cushion material can be ground to a desired profile, depending upon the media handling concerns to be addressed. For instance, a cylinder shape, or a crown, or barrel, or bow tie, or hourglass profile may be provided.

For preparation of the fusing surface layer, the fusing surface layer material is laid down either directly on the fuser base, or on interposing material as indicated. This material is applied by any suitable means, as are known in the art, to form a layer of the requisite thickness, and then curing is affected also by any suitable means, as are known in the art. The first polymer is cured to provide the first elastomer; the second elastomer, if still in curable form, likewise is cured.

There are factors to consider as to preferred maximum fusing surface layer thicknesses in various circumstances. For instance, if internal heating is employed in the fusing process, then the fusing surface layer must not be so thick as to impede heat transfer, and thereby cause the base or core temperature to become excessive. Accordingly, even where the fusing surface layer is directly adjacent to the base, the layer preferably is not thicker than about 2,500 microns.

Where external heating is employed and there is no internal heating, then the fusing surface layer can be thicker. In these circumstances the fusing surface layer can be as thick as about 15,000 microns, or even thicker; theoretically there is no thickness upper limit, subject to considerations of cost and processing limitations.

Minimum thickness is also a matter to be considered. At some point, insufficient thickness of the fusing surface layer results in problems with respect to wearability. Wear can be caused by substrate edges, especially where the substrate is paper, and also can result from the scrubbing of the fusing surface layer by the substrate. Wear by substrate edges is a particular problem where a variety of sizes of substrates are used, because the edge of a smaller substrate can impart a surface defect or groove that may be visible within the toner receiving region of a larger substrate overlaying the defect or groove.

Edge wear defects usually are not visible until the depth of the defect reaches about 3 to 8 mils (about 36 to 203 microns) in depth. If the fusing surface layer is thinner than the depth of the defect, then the underlying fuser base or cushion will be exposed, resulting in fuser member failure. Failure will also result if scrubbing by the substrate penetrates the fusing surface layer.

The fuser member, in a preferred embodiment, comprises a fusing surface layer having a thickness of from about 75 microns to about 2,500 microns, and at least one cushion layer having a total cushion thickness of from about 1,000 to about 15,000 microns. In a more preferred embodiment, the fuser member comprises a fusing surface layer having a thickness of from about 75 microns to about 2,000 microns, and at least one cushion layer having a total cushion thickness of from about 2,000 to about 10,000 microns. In a still more preferred embodiment, the fuser member comprises a fusing surface layer having a thickness of from about 75 microns to about 1,300 microns, and at least one cushion layer having a total thickness of from about 2,200 to about 7,000 microns.

In an embodiment of the invention, the primary heating for the fuser member is external heating, and the fuser member has a single elastomer layer acting both as the fusing surface layer and as a cushion layer. This layer has a thickness of from about 200 mils (about 5,000 microns) to about 400 mils (about 10,000 microns); it comprises 5 percent by volume silicone elastomer domains, 35 percent by volume thermally conductive filler, and a silicone elastomer continuous phase, with both the domains and the filler being dispersed through the silicone elastomer continuous phase.

In another embodiment of the invention, the primary heating for the fuser member is internal heating, but here too the fuser member has a single elastomer layer acting both as the fusing surface layer and as a cushion layer. This single layer also comprises 5 percent by volume silicone elastomer domains, 35 percent by volume thermally conductive filler, and a silicone elastomer continuous phase, with both the domains and the filler being dispersed through the silicone elastomer continuous phase. Here the layer has a thickness of from about 250 microns to about 2,500 microns.

In yet a third particular embodiment of the invention, preferably the primary heating for the fuser member is external heating, and the fuser member has two elastomer cushion layers, one overlying the other, with a total cushion thickness of from about 75 mils (about 2,000 microns) to about 400 mils (about 10,000 microns). The underlying layer in this embodiment acts as a base cushion layer; it does not have thermally conductive filler added thereto, and is a thermally nonconductive or low thermal conductivity material, and yet additionally also preferably comprises Silastic™-J silicone, as described in the examples which follow. The overlying surface layer acts both as the fusing surface layer and as a cushion layer; it comprises silicone elastomer domains dispersed through a silicone elastomer continuous phase, and preferably further comprises, dispersed through the silicone elastomer continuous phase, from about 5 percent by volume to about 35 percent by volume thermally conductive filler. Of the indicated total cushion thickness, the base cushion layer underneath is relatively thicker, and the overlying surface layer is relatively thinner. In this regard, the surface layer has a thickness of from about 10 mils to about 30 mils (from about 250 microns to about 760 microns), with the underlying layer accounting for the remainder.

The fuser member of the invention can be used in toner fusing systems and processes where, during operation, release agent is applied to the fusing surface layer so that this agent contacts toner on the substrate, and can also contact the substrate, during the operation of the fuser member. Particularly where the fuser base is a cylindrical roller or an endless belt, the release agent is applied, while the base is rotating or the belt is running, upstream of the contact area between fuser member and substrate toner.

If employed, release agent preferably is applied so as to form a film on the fusing surface layer. As a matter of particular preference, the release agent is applied so as to form a film that completely or substantially covers the fusing surface layer. Also as a matter of preference, during operation of the system the release agent is applied continuously or substantially continuously, to the fusing surface layer.

Release agents are intended to prohibit, or lessen, offset of toner from the substrate to the fusing surface layer. In performing this function, the release agent can form, or participate in the formation of, a barrier or film that releases the toner. Thereby the toner is inhibited in its contacting of, or even prevented from contacting, the actual fusing surface layer, or at least the fluoroelastomer thereof.

The release agent can be a fluid, such as an oil or a liquid, and is preferably an oil. It can be a solid or a liquid at ambient temperature, and a fluid at operating temperatures. Preferred release agents are those that cause minimal swell of the fuser member elastomer continuous and discontinuous phases.

Also as a matter of preference, the release agent is a polymeric release agent; it can be, for instance, a silicone, a polyorganosiloxane, and particularly a polydimethylsiloxane. As a matter of particular preference, the release agent is a silicone or polyorganosiloxane, or polydimethylsiloxane, oil.

As a matter of preference, the silicone, or polyorganosiloxane, or polydimethylsiloxane, release agents have a viscosity, at ambient temperature, greater than about 5,000 cSt, more preferably greater than about 9,000 cSt, still more preferably from about 10,000 cSt to about 100,000 cSt, and still more preferably from about 20,000 cSt to about 100,000 cSt.

Suitable release agents are those disclosed in U.S. Pat. Nos. 5,824,416, 4,515,884, and 5,780,545. These three patents are incorporated herein in their entireties, by reference thereto.

Commercially available polydimethylsiloxanes which may be used as release agents are the DC200™ polydimethylsiloxanes, from Dow Corning Corporation.

Also suitable are hydrocarbon release agents, particularly polyethylene release agents. Polyethylene release agents which may be used include those that are solid at 25° C., but liquid at operating temperatures, particularly fusing process temperatures. Preferred polyethylenes are those having a molecular weight of from about 300 to about 10,000.

Yet additionally suitable are perfluoropolyether release agents. Commercially available perfluoropolyethers that are suitable for use as release agents include the following: Krytox, from E.I. du Pont de Nemours and Company, Deepwater, N.J.; Fomblin™ Y45, YR, and YPL1500, from Ausimont USA, Inc., Thorofare, N.J.; and Galden™ HT230, HT250, HT270, also from Ausimont USA, Inc.

Further, release agents which may be used include polymeric release agents having functional groups. Appropriate polymeric release agents with functional groups include those which may be found as liquids or solids at room temperature, but are fluid at operating temperatures.

Particular functional group polymeric release agents which may be used include those disclosed in U.S. Pat. Nos. 4,011,362, 4,046,795, and 5,781,840; these patents also are incorporated herein in their entireties. Still further release agents which may be used are the mercaptofunctional polyorganosiloxanes disclosed in U.S. Pat. No. 4,029,827, and the polymeric release agents having functional groups such as carboxy, hydroxy, epoxy, amino, isocyanate, thioether, and mercaptofunctional groups, as disclosed in U.S. Pat. Nos. 4,101,686 and 4,185,140; yet additionally these patents are incorporated herein in their entireties.

The more preferred release agents with functional groups are the mercaptofunctional polyorganosiloxane release agents and the aminofunctional polyorganosiloxane release agents. Particularly preferred are the release agents, including mercaptofunctional polyorganosiloxane release agents, comprising monomercaptofunctional polyorganosiloxanes, or polyorganosiloxanes having one mercaptofunctional group per molecule or polymer chain. Also particularly preferred are release agents, including aminofunctional polyorganosiloxane release agents, comprising monoaminofunctional polyorganosiloxanes, or polyorganosiloxanes having one amino functional group per molecule or polymer chain. In this regard, the release agents disclosed in U.S. Pat. Nos. 5,531,813 and 6,011,946 may be used; these patents are incorporated herein in their entireties.

Further with regard to the functional agents, one point to consider is that because of their expense usually they are diluted with nonfunctional polyorganosiloxanes, particularly nonfunctional polydimethylsiloxanes. Another point is that for obtaining good release activity with a functional release agent, monofunctionality is preferred, so that the molecule cannot react both with toner and with the fusing surface layer, and thereby serve as a toner/fuser member adhesive. Therefore, ideally the monofunctional molecule would comprise a substantial portion of the functional agent.

In fact, the functional polyorganosiloxane preferably comprises as great a proportion of the monofunctional moiety as is practically possible. As a matter of particular preference, the functional polyorganosiloxane has a sufficient monofunctional proportion so as not to act as the indicated adhesive.

A preferred release agent composition comprises a blend of nonfunctional polyorganosiloxane, particularly nonfunctional polydimethylsiloxane, with aminofunctional polyorganosiloxane, and the aminofunctional polyorganosiloxane comprises monoaminofunctional polyorgano-siloxane. Another preferred release agent composition comprises a blend of nonfunctional polyorganosiloxane, particularly nonfunctional polydimethylsiloxane, with mercaptofunctional polyorganosiloxane, and the mercapto-functional polyorganosiloxane comprises monomercaptofunctional polyorganosiloxane.

The release agent may be applied to the fuser member by any suitable applicator, including sump and delivery roller, jet sprayer, etc. Those means as disclosed in U.S. Pat. Nos. 5,017,432 and 4,257,699 may be employed; the latter of these two patents is incorporated herein in its entirety. Preferably the present invention employs a rotating wick oiler or a donor roller oiler.

A rotating wick oiler comprises a storage compartment for the release agent and a wick for extending into this compartment. During operation of the toner fusing system of the invention, the wick is situated so as to be in contact with the stored release agent and also with the fusing surface layer of the fuser member; the wick picks up release agent and transfers it to the fuser member.

A donor roller oiler includes two rollers and a metering blade, which can be a rubber, plastic, or metal blade. One roller meters the oil in conjunction with the blade, and the other transfers the oil to the fuser roller. This type of oiler is common in the art, and is frequently used with fuser members having fluoroelastomer fusing surface layers.

The release agent is applied to the substrate, particularly in the case of paper, preferably at a rate of from about 0.1 to about 20 microliters, more preferably at a rate of about 1.0 to about 8 microliters, per 8½" by 11" copy. The applicator is adjusted to apply the release agent at this rate.

Figure 4:
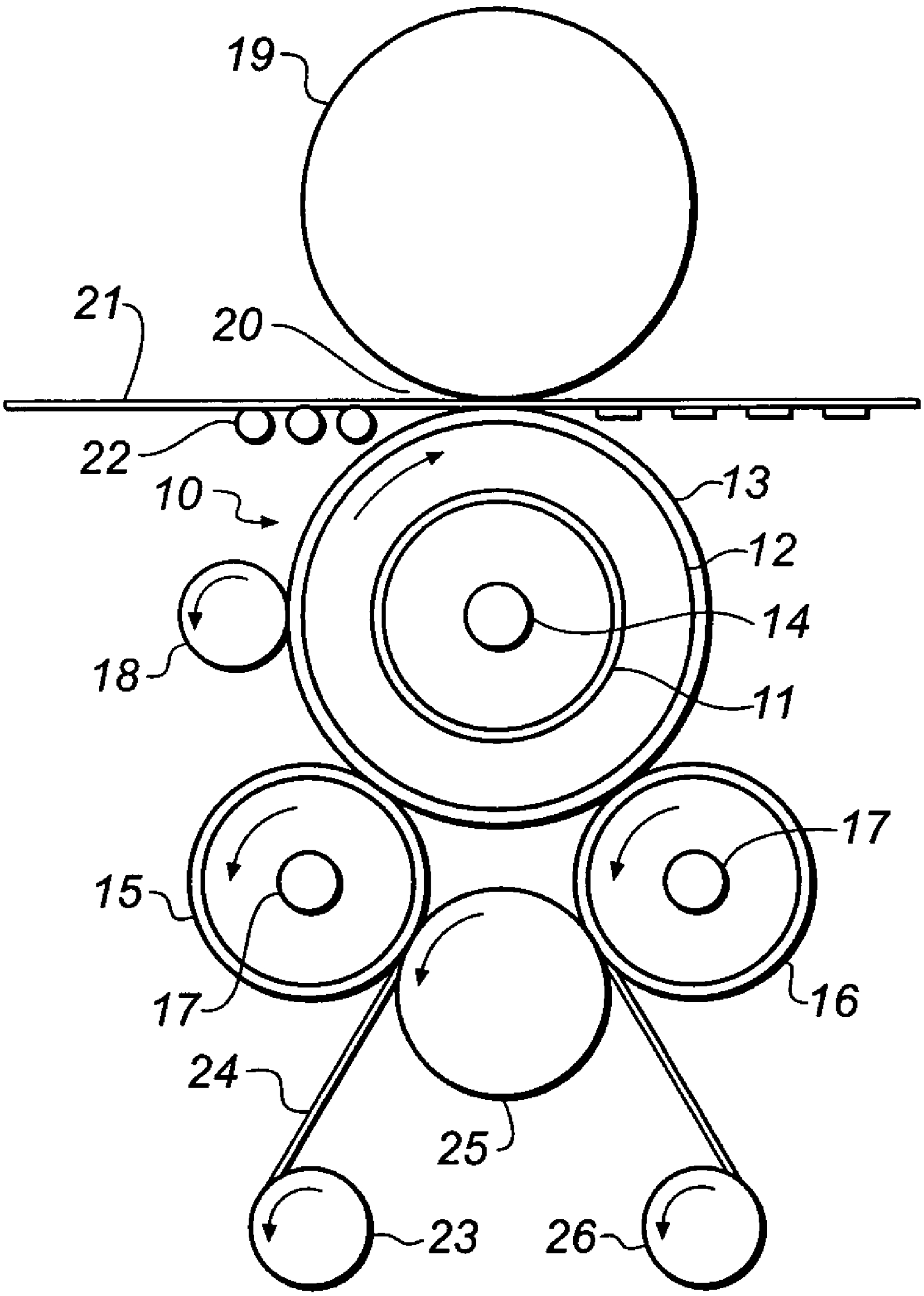
FIG. 4 is a schematic representation, and a sectional view, of a toner fusing assembly of the invention.
Figure 5:
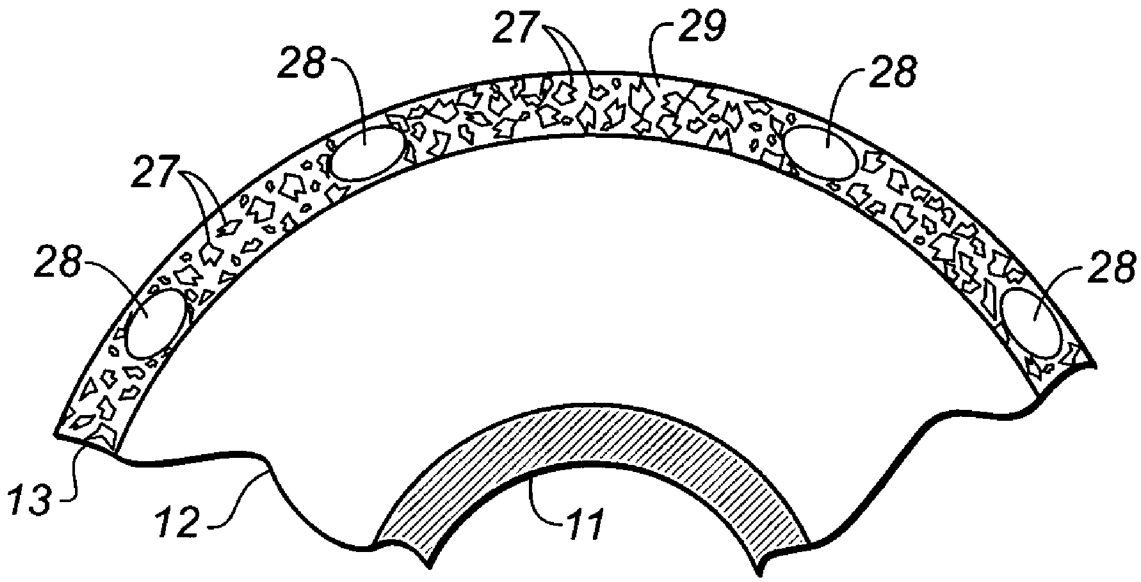
FIG. 5 is a schematic representation, and an enlarged fragmentary sectional view, of an embodiment of the fuser member of the invention.

A toner fusing system of the invention is shown in FIG. 4. Multilayered fuser roller 10 comprises, in sequential order, a fuser base 11, in the form of a hollow cylindrical roller, as well as a cushion layer 12 and a fusing surface layer 13. FIG. 5 shows fusing surface layer 13 with $Fe_2O_3$ filler particles 27 and silicone elastomer particles 28, dispersed in silicone elastomer continuous phase 29. Internal heating member 14, an optional element in the invention, is disposed in the hollow portion of fuser base 11 (FIG. 4).

External heating members 15 and 16 are in the form of hollow cylindrical rollers; their rotational directions, and the rotational directions of all the other rotating elements, is shown by their respective arrows. The rotational directions as depicted can all be reversed.

External heating members 15 and 16 are heated by respective heating lamps 17. These two contact heating members are spaced apart by a distance less than the diameter of fuser member 10, which is in contact with both. Contact heating members 15 and 16 transfer heat to fuser member 10 by their contact with fusing surface layer 13.

Rotating wick oiler 18 applies release agent to fusing surface layer 13.

Support member 19, in the form of a backup roller, cooperates with fuser member 10 to form fusing nip or contact arc 20. Copy paper or other substrate 21, carrying unfused toner images 22, passes through fusing nip 20 so that toner images 22 are contacted by fusing surface layer 13. Support member 19 and fuser member 10 act together to apply pressure to the paper 21 and toner 22, and fuser member 10 also provides heat, with the heat and pressure serving to fuse toner 22 to the paper 21.

Dispensing roller 26 incrementally feeds cleaning web 24 over advance roller 25, to be rolled up onto collecting roller 23. In passing along roller 25, web 24 contacts and cleans contact heating members 15 and 16.

Cleaning web 24 is a polyamide material. A polyamide web which may be employed for this purpose is commercially available under the trademark Nomex® from BMP of America, Medina, N.Y. Any other suitable cleaning material may be employed instead.

In place of the indicated cleaning assembly, any other means or apparatus appropriate for cleaning the contact heating members may be employed. Alternatively, the contact heating members can be provided with a nonstick coating. This coating can be a fluoroplastic, and it can include a heat conducting filler. Where the contact heating members have a nonstick coating the means for cleaning these members can be omitted.

Figure 6:
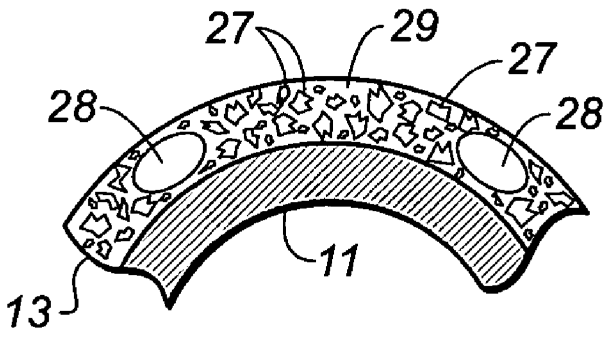
FIG. 6 is a schematic representation, and an enlarged fragmentary sectional view, of another embodiment of the fuser member of the invention.

FIG. 5 shows a fragmentary view of an embodiment of fuser member 10, magnified to show the multiple layers in greater detail. $Fe_2O_3$ filler particles 27 and silicone elastomer particles, depicted as idealized domains 28, are distributed through silicone elastomer continuous phase 29 in fusing surface layer 13. FIG. 6 shows a fragmentary view of another embodiment of fuser member 10, also magnified to show greater detail. In this embodiment there is no cushion, and fusing surface layer 13 resides directly on fuser base 11.

The invention is illustrated by the following procedures; these are provided for the purpose of representation, and are not to be construed as limiting the scope of the invention. Unless stated otherwise, all percentages, parts, etc. are by weight.

EXAMPLES

Materials Employed in the Procedures

LS4340-103 silicone rubber

Catalyst 50, from Emerson & Cuming ICI $Al_2O_3$ (AL601), approx. 12 microns mean particle diameter, from Atlantic Equipment Engineers, Bergenfield, N.J.

OS-20, a solvent from Dow Corning Corporation

Example 250 grams of LS4340-103 polydimethylsiloxane rubber was blended with 1 gram of Catalyst 50, and the resultant blend was degassed, then poured into a mold. In the mold, the LS4340-103/Catalyst 50 blend was cured by ramping the temperature from room temperature to 40° C. over a 1 hour period, and holding the temperature at 40° C. for 12 hours, to obtain a cured silicone slab.

The slab was demolded, torn into chunks, and soaked overnight in OS-20. The swollen chunks were placed in a Waring commercial blender and ground into a uniform elastomer particulate.

348.5 grams of $Al_2O_3$ filler was blended with 151.5 grams of LS4340-103 polydimethylsiloxane rubber. The resultant blend was placed on a three roll mill with a 2 mil gap, and milled until uniform.

A portion of the uniform blend, comprising 40 percent by volume $Al_2O_3$ filler, was designated as Sample A.

Another portion of the uniform blend was combined with sufficient additional LS4340-103 polydimethylsiloxane rubber to provide a composition comprising 27 percent by volume $Al_2O_3$ filler, designated as Sample B1, and yet another portion of the uniform blend was combined with sufficient of the uniform elastomer particulate to provide a composition also comprising 27 percent by volume $Al_2O_3$ filler, designated as Sample B2.

Yet another portion of the uniform blend was combined with sufficient additional LS4340-103 polydimethylsiloxane rubber to provide a composition comprising 33 percent by volume $Al_2O_3$ filler, designated as Sample C1, and still another portion of the uniform blend was combined with sufficient of the uniform elastomer particulate to provide a composition also comprising 33 percent by volume $Al_2O_3$ filler, designated as Sample C2.

Disks A, B1, B2, C1, and C2, each 1.5 inches in diameter and 0.4 inches thick, were prepared from the corresponding A, B1, B2, C1, and C2 Samples, using 1 gram of Catalyst 50 per 150 grams of sample, and curing at 65° C. for 4 to 16 hours; specifically, all of the disks were cured for at least 4 hours, and certain of the disks were cured for longer periods up to 16 hours, as indicated. In this regard, curing for 4 hours at 65° C. would have been sufficient for each of these disks, and continuing this curing for another 12 hours had no substantive effect on the result.

The disks were post cured at 205° C. for 4 hours, cooled, then measured for thermal conductivity, using a TCA-100 guarded plate thermal conductivity analyzer, from Holometrix Inc., Bedford, Mass. The results are set forth in Table 2 below.

TABLE 2

| Disks | $Al_2O_3$ filler (% by volume) | Thermal Conductivity* |
|---|---|---|
| Disk A (rubber + $Al_2O_3$ filler) | 40 | 0.594 |
| Disk B1 (rubber + $Al_2O_3$ filler + additional rubber) | 27 | 0.363 |
| Disk B2 (rubber + $Al_2O_3$ filler + rubber particulate) | 27 | 0.394 |
| Disk C1 (rubber + $Al_2O_3$ filler + additional rubber) | 33 | 0.437 |
| Disk C2 (rubber + $Al_2O_3$ filler + rubber particulate) | 33 | 0.467 |

*Thermal conductivity was measured as $\frac{W}{m \cdot K}$

W = Watts
m = meter
K = temperature (degrees Kelvin)

The foregoing values show the greater thermal conductivity obtained with the present invention. Disks B1 and B2 both comprise 27 percent by volume of the same $Al_2O_3$ thermally conductive filler; however, the latter, with this filler concentrated into a network by the presence of the rubber particulate, exhibits the higher thermal conductivity. And the same comparative results are seen with Disks C1 and C2, each having 33 percent by volume of the $Al_2O_3$ thermally conductive filler.

Figure 7:
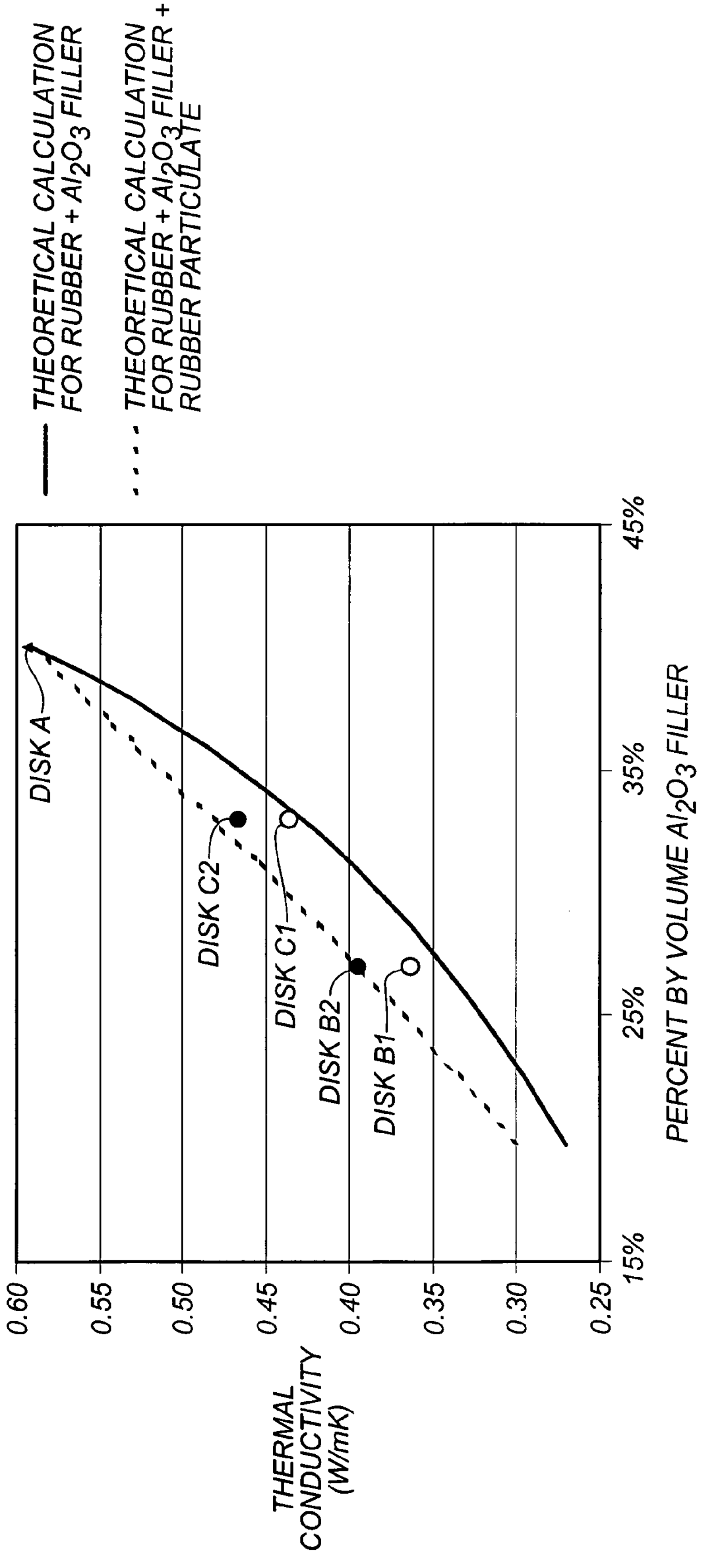
FIG. 7 is a graph showing the effect of thermally conductive filler content on thermal conductivity, according to theoretical calculations, and as actually measured.

In FIG. 7, the Table 2 values are plotted against the curves created for 1st elastomer/filler and 1st elastomer/2nd elastomer/filler dispersions, using the Nielsen equations as indicated. The increase in thermal conductivity at a given concentration of thermally conductive filler, for the compositions of the invention i.e., those also including the elastomer particulate is shown by the higher values obtained for disks B2 and C2, as compared with disks B1 and C1, respectively. The results shown in FIG. 7 also demonstrate that the use of the Nielsen equations as indicated provides a reasonably accurate means for calculating the thermal conductivity of fusing surface layers of the present invention; the modeling employing these equations accordingly can be used in preparing these layers to a desired level of thermal conductivity, without undue experimentation.

Finally, although the invention has been described with reference to particular means, materials, and embodiments, it should be noted that the invention is not limited to the particulars disclosed, and extends to all equivalents within the scope of the claims.

What is claimed:

1. A fuser member for a toner fusing system, comprising:

(a) a base; and (b) a fusing surface layer comprising:

(i) a first elastomer, as a continuous phase; and (ii) a second elastomer, as a discontinuous phase, dispersed through the continuous phase in the form of domains, wherein at least about 25 percent of the second elastomer total repeat units, and at least about 25 percent of the first elastomer total repeat units, are the same monomeric unit; and (iii) thermally conductive filler, dispersed through the continuous phase;

wherein:

the ratio of the mean diameter of the second elastomer discontinuous phase domains to the mean particle diameter of the thermally conductive filler is greater than about 2:1;

the second elastomer is wettable by the first elastomer; and the second elastomer discontinuous phase domains are in sufficient number and of sufficient size and the thermally conductive filler comprises a sufficient proportion by volume of the fusing surface layer, so that the thermally conductive filler is concentrated sufficiently in the continuous phase to be nonuniformly distributed through the fusing surface layer as a network in the continuous phase, this network through the fusing surface layer surrounding second elastomer discontinuous phase domains.

2. The fuser member of claim 1, wherein the second elastomer is spontaneously wettable by the first elastomer.

3. The fuser member of claim 1, wherein the second elastomer discontinuous phase domains have a surface energy of about 35 dynes/cm or less.

4. The fuser member of claim 1, wherein essentially all of the second elastomer total repeat units, and essentially all of the first elastomer total repeat units, are the same monomeric unit.

5. The fuser member of claim 1, wherein the first elastomer continuous phase and the second elastomer discontinuous phase domains have been prepared from the same curable polymer.

6. The fuser member of claim 1, wherein:

the first elastomer repeat units and the second elastomer repeat units comprise the same monomeric units;

the first elastomer and the second elastomer have the same molecular weight between crosslinks;

crosslinking occurs at the same monomeric units of the first elastomer and the second elastomer; and the first elastomer crosslinks and the second elastomer crosslinks have the same molecular structure.

7. The fuser member of claim 1, wherein the first elastomer comprises at least one member selected from the group consisting of perfluoropolyether elastomers, fluoroelastomer elastomers, and polyorganosiloxane elastomers, and wherein the second elastomer comprises at least one member selected from the group consisting of perfluoropolyether elastomers, fluoroelastomer elastomers, and polyorganosiloxane elastomers.

8. The fuser member of claim 7, wherein the first elastomer comprises a polyorganosiloxane elastomer, and wherein the second elastomer comprises a polyorganosiloxane elastomer.

9. The fuser member of claim 8, wherein the first elastomer comprises a polydimethylsiloxane elastomer, and wherein the second elastomer comprises a polydimethylsiloxane elastomer.

10. The fuser member of claim 1, wherein:

the second elastomer discontinuous phase domains have a mean diameter of from about 8 microns to about 60 microns, and comprise from about 10 percent by volume to about 60 percent by volume of the fusing surface layer; and the thermally conductive filler has a mean particle diameter of from about 0.2 microns to about 8 microns, and comprises from about 5 percent by volume to about 35 percent by volume of the fusing surface layer.

11. The fuser member of claim 10, wherein:

the thermally conductive filler comprises from about 5 percent by volume to about 20 percent by volume of the fusing surface layer.

12. The fuser member of claim 1, further comprising at least one cushion layer interposed between the base and the fusing surface layer, the at least one cushion layer comprising at least one polyorganosiloxane elastomer layer.

13. A toner fusing system comprising:

(a) the fuser member of claim 1, for contacting and heating toner residing on a substrate to fuse the toner to the substrate, wherein:
  (i) the first elastomer comprises a polyorganosiloxane elastomer;
  (ii) the second elastomer comprises a polyorganosiloxane elastomer; and
  (iii) the fusing surface layer has a thickness of from about 5,000 microns to about 10,000 microns; and (b) at least one external heating member for heating the fusing surface layer, the at least one external heating member providing more than 50 percent of the heat energy for fusing the toner to the substrate.

14. A toner fusing system comprising:

(a) the fuser member of claim 1, for contacting and heating toner residing on a substrate to fuse the toner to the substrate, wherein:
  (i) the first elastomer comprises a polyorganosiloxane elastomer;
  (ii) the second elastomer comprises a polyorganosiloxane elastomer; and
  (iii) the fusing surface layer has a thickness of from about 250 microns to about 2,500 microns; and (b) at least one internal heating member for heating the fusing surface layer, the at least one internal heating member providing more than 50 percent of the heat energy for fusing the toner to the substrate.

15. A toner fusing system comprising:

(a) the fuser member of claim 1, contacting and heating toner residing on a substrate to fuse The toner to the substrate, wherein:
  (i) the first elastomer comprises a polyorganosiloxane elastomer;
  (ii) the second elastomer comprises a polyorganosiloxane elastomer;
  (iii) the fusing surface layer:
    (A) has a thickness of from about 250 microns to about 760 microns; and
    (B) further comprises thermally conductive filler dispersed through the continuous phase, the thermally conductive filler comprising not more than about 35 percent by volume of the fusing surface layer;
  (iv) the fuser member further comprises a cushion layer interposed between the base and the fusing surface layer, the cushion layer comprising a polyorganosiloxane elastomer layer;
  (v) the total thickness of the fusing surface layer and the cushion layer is from about 2,000 microns to about 10,000 microns; and (b) at least one external heating member for heating the fusing surface layer, the at least one external heating member providing more than 50 percent of the heat energy for fusing the toner to the substrate.

16. A process for fusing toner residing on a substrate to the substrate, the process comprising:

(a) applying a polyorganosiloxane release agent to the fusing surface layer of the fuser member of claim 1, to provide a release agent-treated fusing surface layer:
  (i) the first elastomer comprising a polyorganosiloxane elastomer; and
  (ii) the second elastomer comprising a polyorganosiloxane elastomer; and (b) contacting the toner with the release agent-treated fusing surface layer.

17. The process of claim 16, wherein:

(a) the polyorganosiloxane release agent comprises a polydimethylsiloxane release agent;

(b) the first elastomer comprises a polyditnethylsiloxane elastomer; and (c) the second elastomer comprises a polydimethylsiloxane elastomer.

* * * * *